(12) United States Patent
Baldwin

(10) Patent No.: US 8,884,928 B1
(45) Date of Patent: Nov. 11, 2014

(54) CORRECTING FOR PARALLAX IN ELECTRONIC DISPLAYS

(75) Inventor: Leo B. Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 366 days.

(21) Appl. No.: 13/358,881

(22) Filed: Jan. 26, 2012

(51) Int. Cl.
*G06F 3/041* (2006.01)

(52) U.S. Cl.
USPC ........... 345/178; 345/173; 345/619; 345/649; 345/661

(58) Field of Classification Search
None
See application file for complete search history.

(56) References Cited

U.S. PATENT DOCUMENTS

| | | | |
|---|---|---|---|
| 5,563,988 A | 10/1996 | Maes et al. | |
| 5,616,078 A | 4/1997 | Oh | |
| 6,272,231 B1 | 8/2001 | Maurer et al. | |
| 6,385,331 B2 | 5/2002 | Harakawa et al. | |
| 6,434,255 B1 | 8/2002 | Harakawa | |
| 6,750,848 B1 | 6/2004 | Pryor | |
| 6,863,609 B2 | 3/2005 | Okuda et al. | |
| 7,301,526 B2 | 11/2007 | Marvit et al. | |
| 7,324,093 B1 * | 1/2008 | Gettemy et al. | 345/173 |
| 7,379,566 B2 | 5/2008 | Hildreth | |
| 7,401,783 B2 | 7/2008 | Pryor | |
| 7,519,223 B2 | 4/2009 | Dehlin et al. | |
| 8,004,503 B2 * | 8/2011 | Zotov et al. | 345/178 |
| 8,456,445 B2 * | 6/2013 | De Mers et al. | 345/174 |
| 8,605,038 B2 * | 12/2013 | Cho | 345/173 |
| 2002/0071277 A1 | 6/2002 | Starner et al. | |
| 2004/0140956 A1 | 7/2004 | Kushler et al. | |
| 2007/0164989 A1 | 7/2007 | Rochford et al. | |
| 2008/0005418 A1 | 1/2008 | Julian | |
| 2008/0013826 A1 | 1/2008 | Hillis et al. | |
| 2008/0019589 A1 | 1/2008 | Yoon | |
| 2008/0040692 A1 | 2/2008 | Sunday et al. | |
| 2008/0136916 A1 * | 6/2008 | Wolff | 348/169 |

(Continued)

FOREIGN PATENT DOCUMENTS

| | | |
|---|---|---|
| JP | 2002-164990 | 6/2002 |
| JP | 2002-351603 | 12/2002 |

(Continued)

OTHER PUBLICATIONS

Nokia N95 8GB Data Sheet, Nokia, 2007, 1 page.

(Continued)

*Primary Examiner* — Sumati Lefkowitz
*Assistant Examiner* — Josemarie G Acha, III
(74) *Attorney, Agent, or Firm* — Novak Druce Connolly Bove + Quigg, LLP

(57) ABSTRACT

The ability of a user to provide input when using a touch screen or other such element of a computing device can be improved by correcting for parallax errors. A camera of the computing device can determine the relative position of the user's head or eyes with respect to the device, and determine a viewing perspective of the user with respect to content displayed on the touch screen. Using the perspective direction and information about the dimensions of the touch screen, the device can determine an amount and direction of parallax error, and can make adjustments to remove or minimize that error. The device can cause the position of the displayed graphical elements to shift and/or can adjust the mappings of the touch sensitive regions that correspond to the graphical elements. Such an approach enables the graphical elements and touch mappings to align from the current perspective of the user.

22 Claims, 7 Drawing Sheets

(56) References Cited

U.S. PATENT DOCUMENTS

| | | | |
|---|---|---|---|
| 2008/0158096 A1 | 7/2008 | Breed | |
| 2008/0174570 A1 | 7/2008 | Jobs et al. | |
| 2008/0266326 A1* | 10/2008 | Porwal | 345/659 |
| 2008/0266530 A1 | 10/2008 | Takahashi et al. | |
| 2008/0276196 A1 | 11/2008 | Tang | |
| 2009/0031240 A1 | 1/2009 | Hildreth | |
| 2009/0079813 A1 | 3/2009 | Hildreth | |
| 2009/0265627 A1 | 10/2009 | Kim et al. | |
| 2009/0313584 A1* | 12/2009 | Kerr et al. | 715/849 |
| 2010/0013780 A1* | 1/2010 | Ikeda et al. | 345/173 |
| 2010/0045620 A1* | 2/2010 | Long et al. | 345/173 |
| 2010/0066763 A1* | 3/2010 | MacDougall et al. | 345/656 |
| 2011/0102570 A1* | 5/2011 | Wilf et al. | 348/77 |
| 2011/0254865 A1* | 10/2011 | Yee et al. | 345/661 |
| 2011/0303898 A1* | 12/2011 | Tian et al. | 257/21 |
| 2012/0027267 A1* | 2/2012 | Kim et al. | 382/118 |
| 2012/0032896 A1* | 2/2012 | Vesely et al. | 345/173 |
| 2012/0062549 A1* | 3/2012 | Woo et al. | 345/419 |
| 2012/0113018 A1* | 5/2012 | Yan | 345/173 |
| 2012/0200602 A1* | 8/2012 | Brown et al. | 345/633 |
| 2012/0212429 A1* | 8/2012 | Okura et al. | 345/173 |
| 2012/0218231 A1* | 8/2012 | Slaby et al. | 345/178 |
| 2012/0293444 A1* | 11/2012 | Wong et al. | 345/174 |
| 2012/0293446 A1* | 11/2012 | Crandall et al. | 345/174 |
| 2013/0002661 A1* | 1/2013 | Tanaka et al. | 345/419 |

FOREIGN PATENT DOCUMENTS

| | | |
|---|---|---|
| JP | 2004-318826 | 11/2004 |
| JP | 2007-121489 | 5/2007 |
| JP | 2008-97220 | 4/2008 |
| WO | 02/15560 A3 | 2/2002 |
| WO | 2006/036069 A1 | 4/2006 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Final Office Action dated Oct. 27, 2011", U.S. Appl. No. 12/332,049, 66 pages.

"Final Office Action dated Jun. 6, 2013", U.S. Appl. No. 12/332,049, 70 pages.

"First Office Action dated Mar. 22, 2013", China Application 200980146841.0, 40 pages.

"International Search Report dated Apr. 7, 2010", International Application PCT/US09/65364, Apr. 7, 2010, 2 pages.

"International Written Opinion dated Apr. 7, 2010", International Application PCT/US09/65364, Apr. 7, 2010, 7 pages.

"Introducing the Wii MotionPlus, Nintendo's Upcoming Accessory for The Revolutionary Wii Remote at Nintendo:: What's New", Nintendo Games, http://www.nintendo.com/whatsnew/detail/eM-MuRj_N6vntHPDycCJAKWhE09zBvyPH, Jul. 14, 2008, 2 pages.

"Non Final Office Action dated Nov. 7, 2012", U.S. Appl. No. 12/332,049, 64 pages.

"Non Final Office Action dated Dec. 21, 2012", Korea Application 10-2011-7013875, 3 pages.

"Non Final Office Action dated Apr. 2, 2013", Japan Application 2011-537661, 2 pages.

"Non Final Office Action dated Jun. 11, 2011", U.S. Appl. No. 12/332,049, 53 pages.

"Office Action dated May 13, 2013", Canada Application 2,743,914, 2 pages.

Brashear, Helene et al., "Using Multiple Sensors for Mobile Sign Language Recognition", International Symposium on Wearable Computers, Oct. 2003, 8 pages.

Cornell, Jay, "Does this Headline Know You're Reading It?", h+ Magazine, located at <located at <http:l/hplusmagazine.comiarticles/ai/does-headline-know-you%E2%80%99re-reading-it>, last accessed on Jun. 7, 2010, Mar. 19, 2010, 4 pages.

Haro, Antonio et al., "Mobile Camera-Based Adaptive Viewing", MUM '05 Proceedings of the 4th International Conference on Mobile and Ubiquitous Mulitmedia., 2005, 6 pages.

Padilla, Raymond, "Eye Toy (PS2)", <http://www.archive.gamespy.com/hardware/august03/eyetoyps2/index.shtml, Aug. 16, 2003, 2 pages.

Schneider, Jason, "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.

Tyser, Peter, "Control an iPod with Gestures", http://www.videsignline.com/howto/170702555, Sep. 11, 2005, 4 pages.

Zyga, Lisa, "Hacking the Wii Remote for Physics Class", PHYSorg.com, http://www.physorg.com/news104502773.html, Jul. 24, 2007, 2 pages.

\* cited by examiner

CORRECTING FOR PARALLAX IN ELECTRONIC DISPLAYS

BACKGROUND

People are increasingly utilizing portable electronic devices to perform various types of tasks. While the small size and light weight of these devices provide various advantages, these aspects come with certain limitations as well. For example, the size of a display screen on many of these devices is relatively small, less than four inches diagonally in many instances, such that it can be difficult to precisely select items displayed on a touch screen when using a human finger or thumb, which can have a contact area of over a quarter inch in diameter. A further complication with selecting the desired element on a display screen arises from the fact that the image displayed by the touch screen is not actually displayed on the top of the screen, or the outer surface, but an inner surface of the display. Due to the thickness of one or more layers above the actual display surface, there can be optical effects (e.g., parallax) that cause the apparent location of a virtual key displayed on the display screen to be offset from the location where that key is mapped to the touch-sensitive surface. Such an effect can further difficulty for certain users in selecting or providing the intended input.

BRIEF DESCRIPTION OF THE DRAWINGS

Various embodiments in accordance with the present disclosure will be described with reference to the drawings, in which.

DETAILED DESCRIPTION

Figure 1:
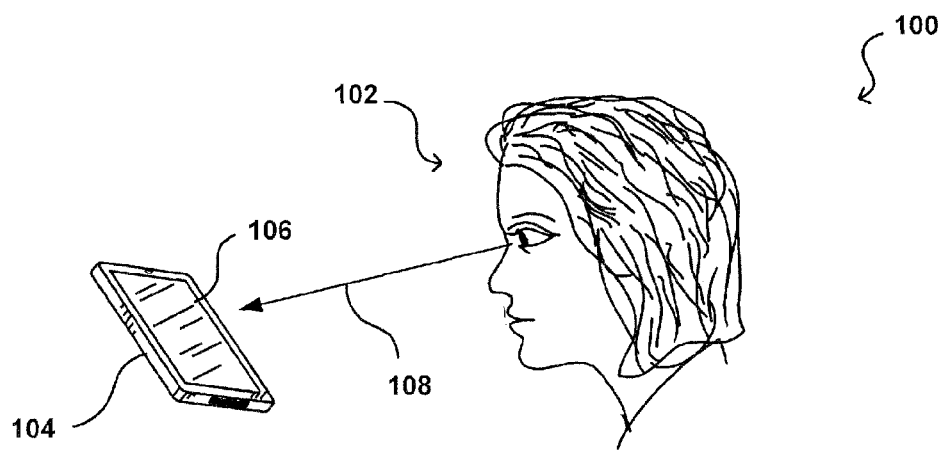
FIG. 1 illustrates an example of a user interacting with a computing device in accordance with at least one embodiment.

Systems and methods in accordance with various embodiments of the present disclosure may overcome one or more of the aforementioned and other deficiencies experienced in conventional approaches to enabling a user to interact with an electronic device. In particular, various approaches discussed herein can account for parallax errors and other optical effects resulting from the separation between a display surface and a touch-sensitive surface in a touch screen or other such element. The touch screen can be any appropriate touch screen, such as a screen that utilizes capacitive, optical, or resistive touch input, for example, and that can include both a display screen and a touch sensitive surface, comprising one or more elements or layers. In various embodiments, the surface on which an image is displayed will be slightly separated from the effective surface of a touch sensitive display, due to the thickness of various layers, configuration of the device, and other such aspects. As the user increases a tilt angle of the device with respect to the user's head or eyes, for example, the amount of parallax effect will increase, such that the apparent location of an element of a virtual interface can be increasingly offset with respect to the corresponding portion of the touch-sensitive surface that is mapped or assigned to that element. By knowing the amount of separation between the display and input surfaces or planes, and determining the angle and/or direction at which the user is viewing the display, the device can calculate an amount of parallax that the user would experience, and can attempt to compensate for the effect. For example, the display graphics that define soft keys or other virtual input elements on a touch pad can be moved a small amount to correct for parallax viewing errors. Alternatively, the areas on the touch surface that correspond to the defined soft keys can be moved to correct for the parallax errors.

In at least some embodiments, a computing device can determine a relative position of the head, eyes, or other such feature or aspect of a user. By determining this relative position, the device can determine the approximate viewing angle of the user. This viewing angle can be used with the thickness configuration information of the display element to calculate an amount of parallax that would be experienced. If the amount of parallax is below a certain amount or threshold, the image displayed on the display element can be shifted slightly such that the display area, from the perspective of the user, will align with the input position on the touch sensitive layer or surface. If the amount of parallax is greater than a certain amount or threshold, the portion of the touch sensitive surface mapped to a displayed element can be shifted such that the touch sensitive portion is shifted to the location where the interface element appears to be displayed, from the perspective of the user. Such an approach can enable the apparent and actual input locations of various interface elements to be dynamically aligned over a range of tilt angles of the device by tracking the relative position or perspective of the user.

Various other applications, processes, and uses are presented below with respect to the various embodiments.

FIG. 1 illustrates an example situation 100 wherein a user 102 is viewing content displayed on a display screen 106 of a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. As illustrated, users often are not positioned directly in front of the screen and/or do not orient themselves such that a plane of the display screen of such a device is orthogonal to the viewing direction 108 of the user. Since the display screen 106 of a conventional computing device can be composed of several layers, interfaces, and/or surfaces, there can be various optical effects that can affect the ability of the user to interact with the device. For example, the touch sensitive part (i.e., the front surface) of a touch screen is separated from the key definitions of a virtual keyboard, displayed via the display screen, by one layer of glass for an active-matrix organic light-emitting diode (AMOLED) screen and two layers of glass for a liquid crystal display (LCD) screen, which can result in a separation on the order of about one-half to three-fourths of a millimeter for conventional displays. Due at least in part to this separation, the definition of the key location has an error due to parallax for any viewing position other than "straight on," or directly in front of the key definition location.

Figure 2A:
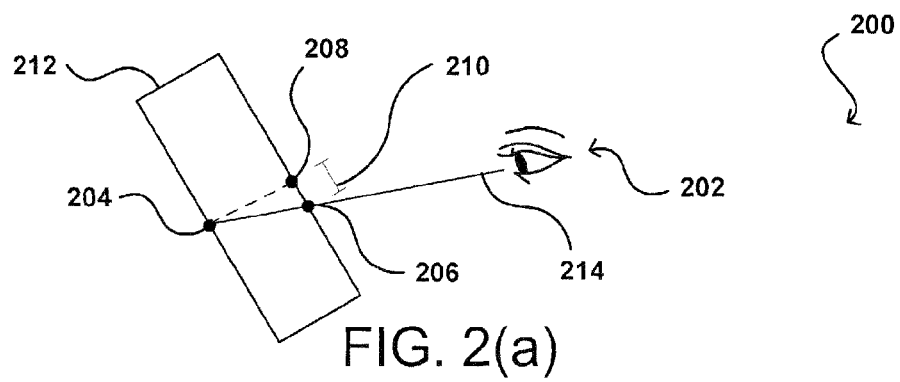
FIGS. 2(a) and 2(b) illustrate example parallax effects that can be addressed in accordance with various embodiments.

For example, FIG. 2(a) illustrates an example situation 200 wherein a user is viewing information displayed on a display element of a computing device. In this example, the display element is shown to include a transparent layer 212 having an exaggerated thickness for purposes of explanation. It should be understood that this element can be part of a multilayer assembly or stack, and that the single illustrated element can comprise multiple different layers within the scope of various embodiments. In this example, an image to be displayed by the display element can be generated at a location 204 on the back surface of the layer 212. There also can be a corresponding point 208 on the front of the layer 212 to which the image is mapped, such that the user can select the displayed image by contacting or otherwise interacting with the mapped point or the touch surface. From a device standpoint, the touch sensitive location 208 is directly "above" the image location, or mapped along a vector orthogonal to the primary plane of the layer. As illustrated, however, the eyes 202 of the user are not along this orthogonal vector, but are instead along a viewing vector 214 (or gaze direction or perspective, for example) that is offset at an angle with respect to the display element layer 212. As illustrated, from the current viewing location of the user's eyes the location 206 on the front of the layer that would correspond to the image location 204 is offset an amount 210 from the actual touch input location 208 that is mapped to the image location 204 by the device. Thus, a user wanting to touch the front surface of the layer 212 to provide input, such as to select the image at the image location 204, may tend to select a location 206 that is offset an amount 210 from the mapped input location 208. It should be understood that terms such as "front" and "top" are used for purposes of simplicity of explanation and are not intended to require specific orientations unless otherwise stated.

Figure 2B:
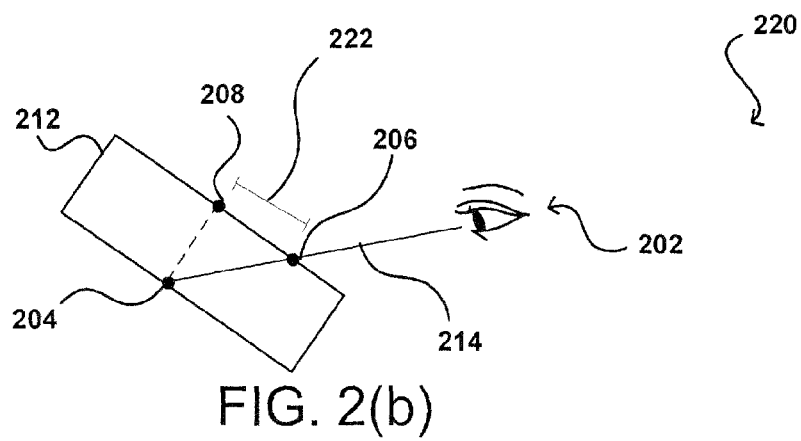

As illustrated in the example situation 220 of FIG. 2(b), the problem is exacerbated when the tilt angle of the display layer 212 is increased with respect to the gaze direction 214 of the user's eyes 202. As illustrated, the change in the angular orientation of the layer 212 with respect to the gaze direction 214 has led to a corresponding increase in the offset 222 between the apparent mapped location 206, from the point of view or perspective of the user, and the actual mapped position 208 determined by the device. In devices such as small portable devices where the screen might be relatively small and the input elements or images very small, such an amount of offset lead to difficulty in the user being able to provide input to the device, as the user in FIG. 2(b) would have to learn to press at the actual mapped location 208 even when it appears to the user that the user would have to select a different position 206. The user would also have to be aware of the change in offset with viewing angle, which can make it further difficult to effectively and consistently interact with the device.

Approaches in accordance with various embodiments can attempt to determine a current relative position of the user with respect to the device, in order to determine a relative viewing angle or perspective of the user. The device then can determine an amount of offset due to the viewing angle, and can account for this offset by adjusting the image displayed, the mapping of the touch input locations, or a combination thereof. In various embodiments, a computing device can track the viewing angle of the user over time in order to dynamically update the amount of offset as needed, such that the touch sensitive mappings will substantially correspond to the displayed image information or other displayed content, regardless of viewing angle.

Figure 3A:
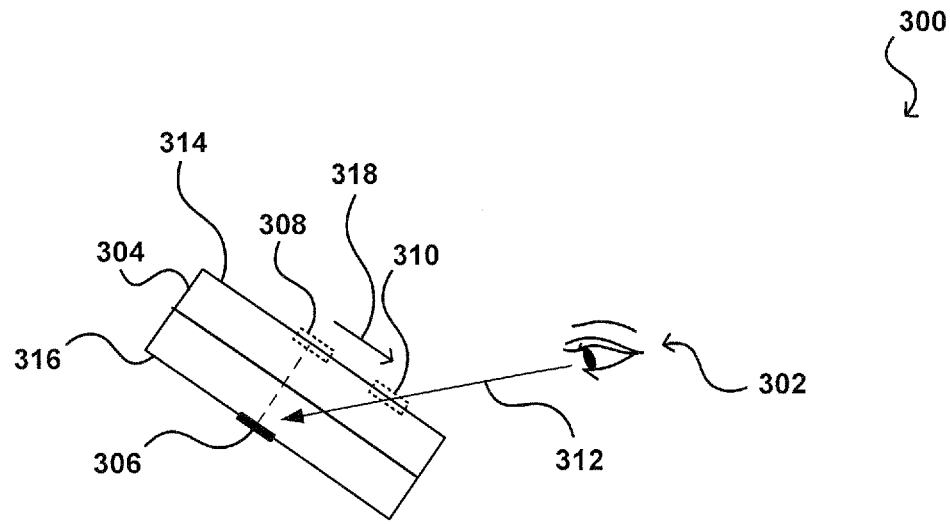
FIGS. 3(a) and 3(b) illustrate example interface adjustments that can be made to offset parallax effects in accordance with various embodiments.

For example, FIG. 3(a) illustrates an example situation 300 wherein a user's eyes 302 are positioned along a viewing or gaze direction 312 that is at a substantial angle with respect to a multi-layer display element 304. In this example, the user would like to select a portion of a touch sensitive surface 314 that is mapped to a portion 306 of content displayed on a display surface 316, such as may correspond to a letter of a virtual keyboard displayed on the display element. Without compensation or adjustment, the device might provide a default mapping of the displayed portion 306 to a corresponding portion 308 on the touch sensitive surface 314, as may correspond to a default or "normal" viewing angle. In this example, however, the device can know the thickness of the layers between the display surface 316 and the touch-sensitive surface 314, and can determine the viewing direction or perspective 312 of the user. Using this information, the device can calculate (using a conventional trigonometric approach, for example) the distance 318 and direction which the mapping of the touch sensitive surface should be adjusted to enable a portion 310 of the touch sensitive layer 314 to correspond to a portion 306 of the display layer 316 from the perspective of the user.

Figure 3B:
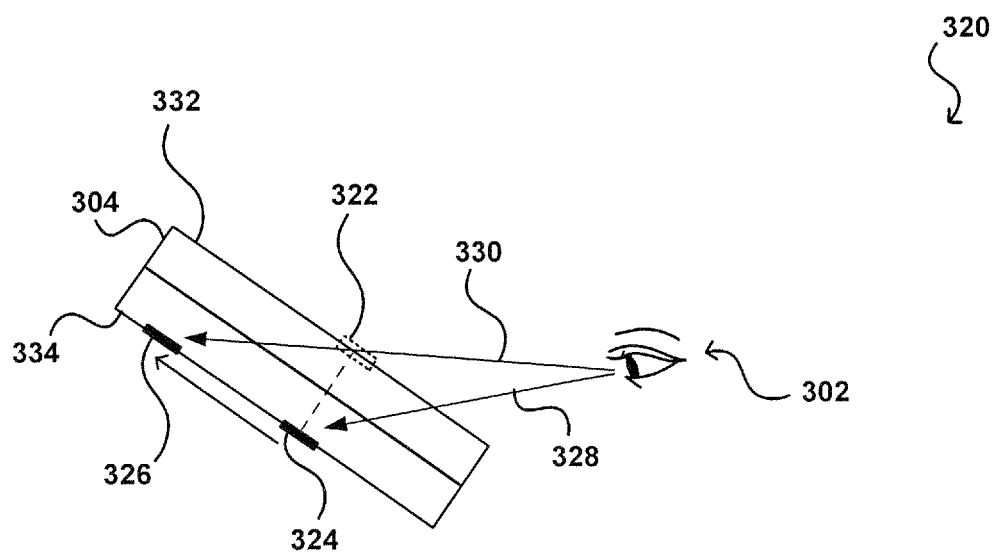

FIG. 3(b) illustrates another example situation 320 wherein a user's eyes 302 are positioned along a viewing or gaze direction 328 with respect to a portion 324 of an image displayed on a display surface 324 of a display element 304. As above, common elements of a display such as a series of light emitting diodes (LEDs) or a grating are not shown for simplicity of explanation, but one of ordinary skill in the art would know how to take conventional components to make a functional display screen that can be used in accordance with various embodiments. In this example, the portion 322 of the touch sensitive surface 332 that is mapped by the device to the image portion 324 is not along the line of sight from the user's eye 302 to the image portion 324, such that the user can tend to provide input to a region of the touch sensitive surface that is mapped by the device to another image portion (not shown). In this example, instead of adjusting the location of the touch sensitive surface that is mapped to the image portion, the device can instead shift the image portion 324 to a new location 326 such that the line of sight or perspective 330 of the user when looking at the new location 326 passes through the proper mapped portion 332 of the touch sensitive surface 332. Thus, a device can address the parallax effect and enable a mapping to be implemented that corresponds to the perspective of the user by shifting the image position or adjusting the mapping of the effective portion of the touch-sensitive layer, effectively shifting active regions of the touch-sensitive layer.

As illustrated in FIGS. 3(a) and 3(b), however, it can be seen that adjusting the position of the image can require a larger shift than is required for the location of the touch sensitive mappings. Further, a user will notice large shifts in the image location but may not even be aware of the shifting of the touch sensitive mapping regions with changes in perspective. Accordingly, it can be desirable in some embodiments to shift the mappings of the regions of the touch sensitive layer to correspond to the proper portions of the image from the user's current perspective. Many conventional display systems have a finer resolution than the associated touch screen elements, allowing a more accurate or fine parallax correction to be made by adjusting the display graphic but a more coarse adjustment to be made using the button mappings. Accordingly, approaches in accordance with various embodiments can combine the shifting of the image or other displayed content with the mapping of various regions of the touch sensitive layer.

In one embodiment, at least one threshold amount of parallax or offset might be specified. For example, an offset might have to accumulate to at least a half (or other fraction) of a pixel before the device attempts to modify either the image or the mappings. In some embodiments, an offset value that meets or exceeds this minimum shift amount, but is less than some second shift criterion or threshold, will result in an image shift. For example, an offset that is at least 0.3 pixels might cause a shift to correct for parallax, and if that image shift is less than a value such as two pixels, or 10 degrees of change in angular view, the adjustment might be performed via shifting of the image. Any shift or offset greater than that amount can instead be handled by adjusting the touch sensitive mappings. Such an approach balances factors such as power savings and accuracy with user experience, as the user might typically operate the device in a fashion that will enable the finer pitched image-based approach to be utilized, while less frequent but larger shifts can take advantage of the mapping approach, such that the image does not jump around as the user tilts the device or otherwise changes relative orientation. In some embodiments, the mapped location of various inputs can be adjusted for large amounts of parallax error, with any residual error being accounted for by moving the image.

Figure 4A:
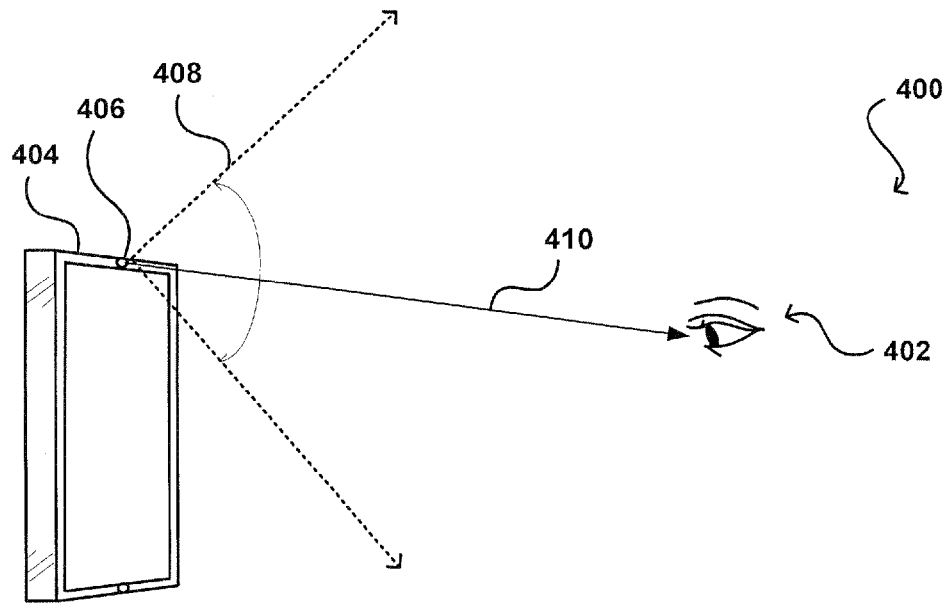
FIGS. 4(a) and 4(b) illustrate an example process for determining the amount and direction of parallax to be offset in accordance with various embodiments.
Figure 4B:
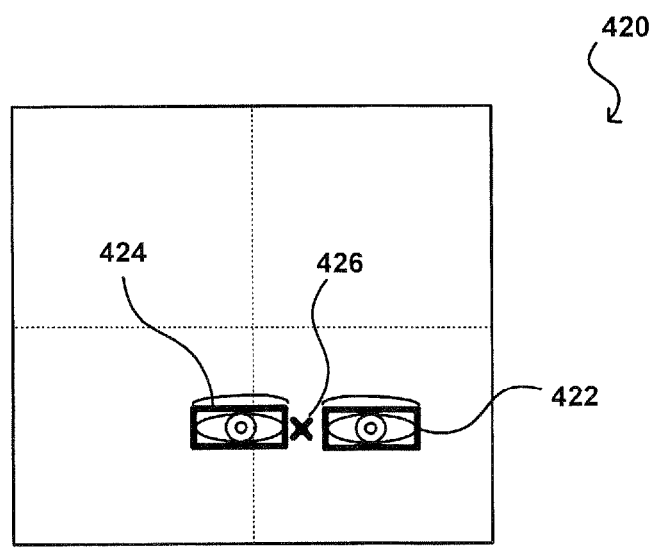

FIGS. 4(a) and 4(b) illustrate an example approach to determining the relative position and/or perspective of a user that can be used to determine and adjust for parallax in accordance with various embodiments. In this example, one or more of the user's eyes 402 is detected in image information captured by a camera 406 of a computing device 404 when at least a portion of the user's head is within the field of view 408 of the camera. In many embodiments, where the device is looking for a viewing direction, a single camera can be sufficient to provide that direction. In other embodiments where more accurate corrections are desired, stereo imaging using two cameras, or another such approach that provides information in three dimensions (or otherwise including distance) can be used to determine the position of the user's eyes in three dimensions, which can help to determine more accurate adjustment vectors based at least in part upon the distance to the user's eyes. In at least some embodiments, determining the relative direction to the user's head can be sufficient to provide for parallax correction, as small deviations in angle can result in offsets that are less than a pixel in length and may not noticeably affect the performance of the device.

In some embodiments, the camera 406 can be a video capture element capable of capturing a substantially continuous stream of image information, at least over a specified period of time. Since it can be very resource intensive to process the entire video stream using facial detection algorithms or other such processes, various approaches can instead utilize a less robust algorithm, such as a pattern matching algorithm, to attempt to identify the presence of a person's head or other such feature in the image stream. For example, a pattern matching algorithm can look for a contour or shape that matches the shape of a human head within a specified level or range of certainty. Various other approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon detecting such a shape or contour, the device can track a relative position or area in the captured image information corresponding to the user's head. Approaches for detecting and tracking shapes or contours are known in the art and as such will not be discussed herein in detail. In at least some embodiments, the detection of a user's head can cause at least one perspective determining process to be activated, or can at least trigger a portion of a relative position determining process. In some embodiments, a computing device can have at least one infrared (IR) emitter and receiver, or at least one IR transceiver, operable to transmit IR radiation and detect IR reflected back from one or more objects within a field of view of the IR receiver. As known in the art, the human eye reflects IR radiation differently than the rest of the human head, such that the presence and/or position of a user's eyes can quickly be detected and/or located by analyzing a captured IR image. Such information can help determine the presence of a user's head without requiring significant image processing, and can also help improve the perspective determinations in at least some embodiments.

In FIG. 4(b), a similar approach can be used to locate the user's eyes or another such feature. In this example 400, a recognition algorithm might first analyze the captured image 420 to locate a region including a user's head, to reduce the amount of image information that needs to be analyzed. On a reduce portion or an entire image, for example, a pattern recognition algorithm or other process (e.g., IR recognition) discussed or suggested above can be used to locate one or more eyes of the user in the image information. In addition to the algorithms discussed above, other approaches for locating an iris or pupil of a user, such as by monitoring infrared reflection, can be utilized as well within the scope of the various embodiments. Examples of such approaches can be found, for example, in co-pending U.S. patent application Ser. No. 12/332,049, entitled "Movement Recognition as Input Mechanism," filed Dec. 10, 2008, which is hereby incorporated herein by reference. In this example, a detection algorithm finds and tracks the regions 422, 424 of the user's eyes in the captured video information. Based at least in part upon these regions, the device can determine a point 426 between those regions that can correspond to the user head or eye "location" used to determine the gaze direction, point of view, or perspective of the user for purposes of parallax determination.

As illustrated in this example, both eyes of the user might be able to be located in the captured image information. Depending on factors such as the desired level of sensitivity and distance between the user and the device, however, such information can impact the accuracy of the input position determinations. For example, a vector from the user's right eye through the display element might intersect the touch sensitive surface at a substantially different location than a vector from the user's left eye, which can result in erroneous shift determinations. Approaches in accordance with various embodiments can take advantage of the fact that the human brain combines and processes information from both eyes such that the user views the device from a "single" point of view. Thus, the software can attempt to determine an intermediate point 426 between the user's eyes to use as the user's point of view. Various other approaches can be used as well, such as are discussed later herein.

To further improve accuracy, approaches in accordance with various embodiments can also account for the fact that humans typically have a dominant eye, such that the point of view for a given user typically will not be a center point between that user's eyes. For example, a person who is right eye dominant will have a point of view that is closer to that user's right eye. Further, right eye dominant users often have less offset than left eye dominant people. In some embodiments, an initial calibration procedure can be used to attempt to determine a user's point of view. In other embodiments, a center point of the user's eyes can be used as an initial approximation, and then small adjustments made by the user over time can be monitored to attempt to adjust the center point determination, such as where the user frequently drifts his or her finger slightly to the left to select the correct element. In at least some situations, this information can be stored and/or updated for each user, such that the accuracy can be improved even when multiple users utilize a single device. Various other calibration adjustments can be done in real time as well, as may be due to other variations between specific users.

Figure 5:
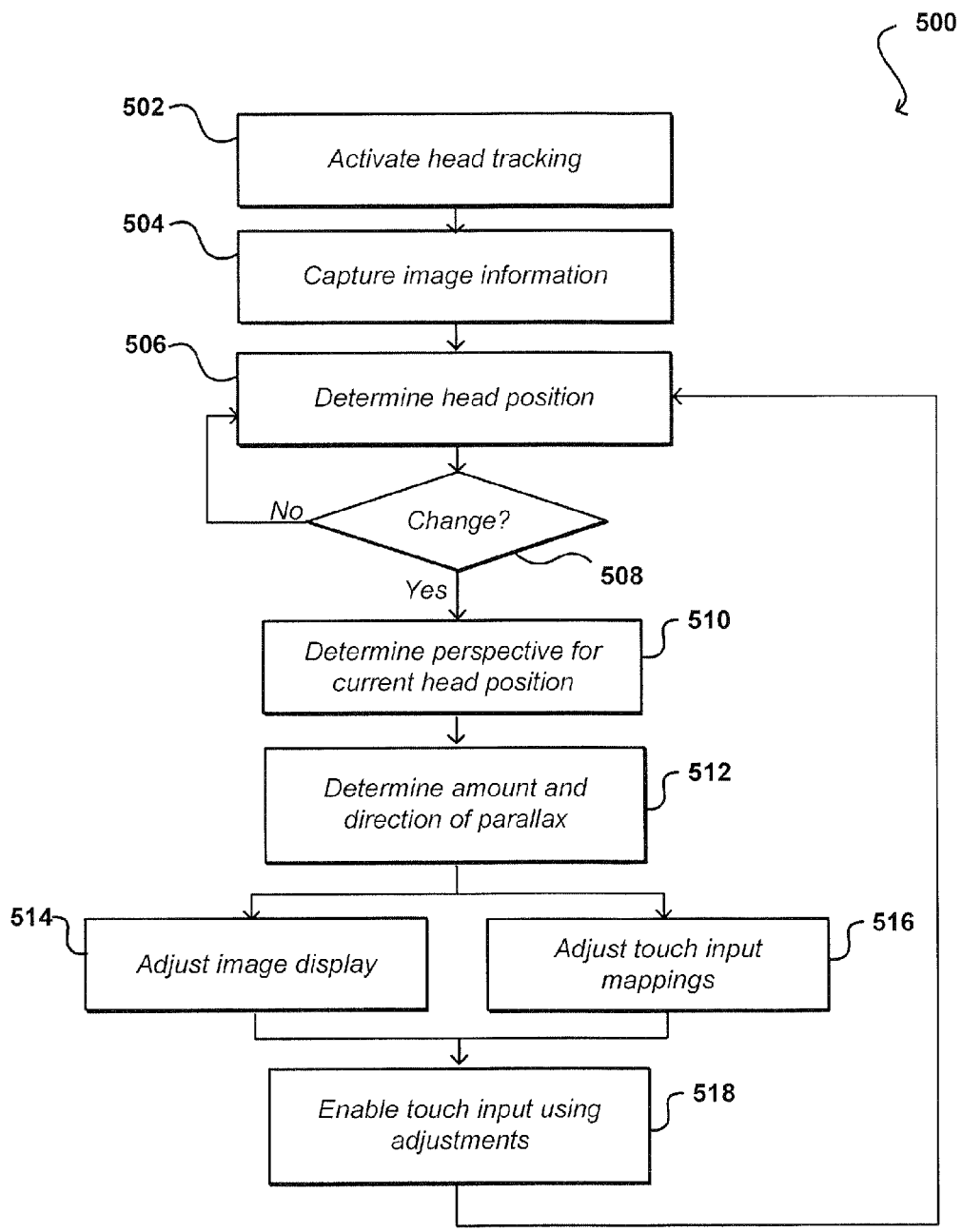
FIG. 5 illustrates an example process for determining and accounting for parallax effects that can be used in accordance with various embodiments.

FIG. 5 illustrates an example process 500 for correcting parallax errors that can be used in accordance with various embodiments. It should be understood that, for any process discussed herein, there can be additional, fewer, or alternative steps performed in similar or alternative orders, or in parallel, within the scope of the various embodiments unless otherwise stated. In this example, head (or feature) tracking is activated 502 on a computing device. The tracking can be activated manually, by a user, or automatically in response to an application, activation, startup, or other such action. Further, the feature that the process tracks can be specified or adjusted by a user, provider, or other such entity, and can include any appropriate feature such as the eyes, nose, pupils, or other such feature. In at least some embodiments a determination can be made as to whether there is sufficient lighting for image capture and analysis, such as by using a light sensor or analyzing the intensity of captured image information. In at least some embodiments, a determination that the lighting is not sufficient can cause one or more types of illumination to be activated on the device. In at least some embodiments, this can include activating one or more white light LEDs positioned to illuminate a feature within the field of view of at least one camera attempting to capture image information. As discussed elsewhere herein, other types of illumination can be used as well, such as infrared (IR) radiation useful in separating a feature in the foreground from objects in the background of an image, or for quickly locating the pupils of a user, among other such aspects.

During the process, at least one camera can capture 504 image information as discussed elsewhere herein. The captured image information, which can be a series of still images or a stream of video information in various embodiments, can be analyzed to attempt to determine 506 the relative head position of the user with respect to the device. As discussed elsewhere herein, various image recognition, contour matching, color matching, retro-reflection, or other such approaches can be used to identify a feature of interest (e.g., head or eyes) from the captured image information. When the head is located and its relative distance determined, another determination can be made 508 as to whether the current head position has changed by a minimum or threshold amount with respect to a previous relative position (or, for an initial determination, whether the head position is away from the default position). In at least some embodiments, parallax corrections will only be made if the relative position or amount of parallax error has changed by an amount determined to justify the processing and resource usage needed to adjust for the change in parallax, as may be configurable by a device provider, user, or other such entity. The relative head position can change due to a motion of the user, the device, or both.

If the relative head position has not changed by at least a threshold amount, the device can continue to operate with the current display and touch settings and can continue to monitor relative head position. If, on the other hand, the head position has changed by at least a threshold amount, the device can determine 510 the perspective, viewing vector, trajectory, or other such value for the current perspective, and can use this information with the thickness information (or other configuration or dimension information) about the display element to determine 512 the amount and direction of parallax that the user would experience absent correction. As discussed elsewhere herein, a single trajectory, multiple trajectories, or a distribution of trajectories can be determined in various embodiments. Based upon factors such as the amount of parallax, change in parallax from a previous position, configuration settings, and other such information, the device can adjust 514 the image display such that the viewed interface elements align with the mapped touch regions or can adjust 516 the mapped touch input regions to that those regions align with the image information. In some embodiments, the device can do a combination of both actions as discussed herein. Once the adjustments are made, the device can enable 518 the user to utilize the adjusted touch input settings, which can allow for more accurate input from the current perspective of the user.

In some embodiments, a single viewing angle or perspective may be sufficient to correct for parallax error. For larger displays or more accurate results, however, it can be desirable to calculate multiple perspectives or trajectories between the eyes or head of the user and various areas of the display. For example, a single trajectory or perspective from the user's eyes to the middle of the screen might not sufficiently correct for parallax errors near the edges of the display, where the incident angle might be significantly different. Accordingly, a set of trajectories or mappings, or a function of angles, can be determined to assist with correcting parallax. In some embodiments, each individual input element can have a perspective trajectory determined such that the mapping for that element can substantially overlap the display graphic for that element from the perspective of the user.

In order to further improve accuracy, at least some embodiments can also adjust the size of one or more graphic display elements to account for the apparent foreshortening in the direction of the acute trajectory. For example, tilting a computing device can cause certain letters of a keyboard to appear larger than other letters due to the tilt. In order to correct for this difference, the device can determine the tilt angle (or relative perspective) and determine a difference in size for the various input elements. The device can then adjust the displayed size of at least some of the elements such that the elements appear similar in size and match the sizes of the corresponding mapped input regions. Alternatively, the device can adjust the size of the mapped input regions on the touch sensitive surface. Also, the device could do a combination of both, making coarse adjustments using the touch screen and fine adjustments using the graphic display. Various other approaches can be used as well within the scope of the various embodiments.

As mentioned, the perspective of the user can be determined using at least one camera positioned on the computing device such that at least a portion of the user will likely be within a field of view of the camera when the user is viewing content on a display screen of the device. In many embodiments, this will involve at least one camera on a same or similar side or surface of the device. In some embodiments the information can be captured using a conventional front-facing camera on the device, while in other embodiments a dedicated camera or sensor system including one or more relatively low resolution and/or low power cameras or sensors can be used for purposes such as perspective determination, motion sensing, gesture detection, and the like.

In at least some embodiments, parallax determinations can be made using a standard video rate, such as around seven to thirty frames per second. A person's head can move quite quickly, such that a relatively fast rate can be desired, but the speed can be balanced with the desire to conserve power, as well as memory and processing capacity. To further conserve resources, a device might only calculate perspective and correct for parallax when the user is in a virtual keypad entry mode, the user starts interacting with the touch screen, the device is tilted at an angle, or another such event or state occurs. The triggers for starting parallax corrections can be configurable by the user. There also can be latency on the order of thirty to sixty milliseconds in some example devices, which can reduce resource consumption but be virtually unnoticeable to the user. Further, in at least some embodiments the head position can be determined using a high resolution camera, in order to be better able to properly identify the head from the image information, after which the identified head object can be tracked using a lower resolution camera. In situations where the user is typing using the touch screen, the user typically will be close enough to perform eye tracking using a relatively low resolution camera as well. The cameras in at least some embodiments can utilize wide angle lenses such that the eyes or head are not lost as the user tilts the device.

Figure 6:
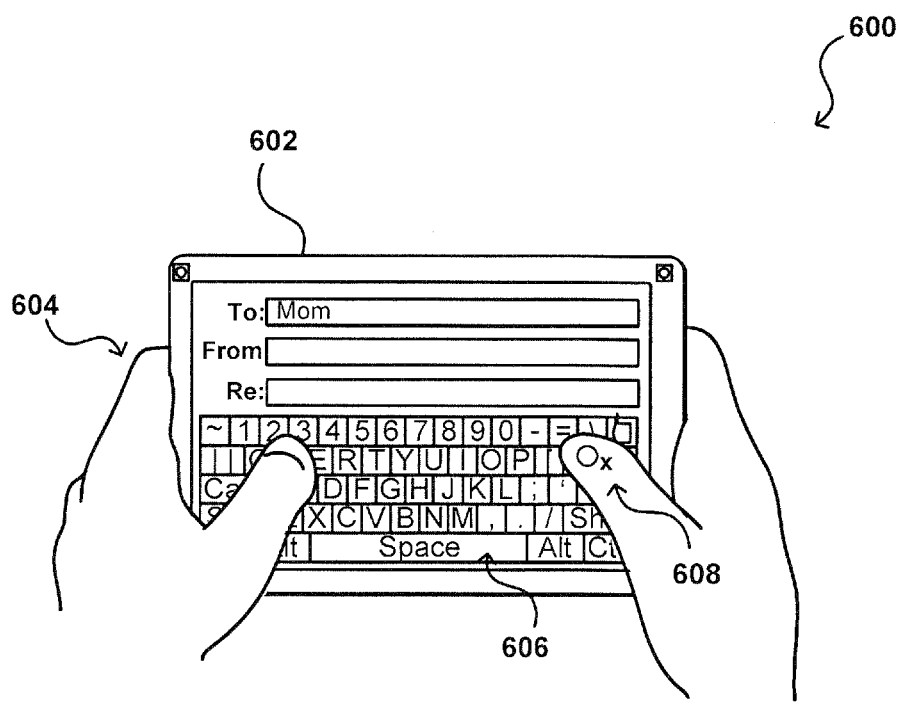
FIG. 6 illustrates an example input offset that can be accounted for in accordance with various embodiments.

Approaches in accordance with various embodiments can attempt to correct for other perspective-dependent errors as well. For example, FIG. 6 illustrates an example situation 600 wherein a user is holding a computing device 602 in the user's hands 604 and using his or her thumbs to type on a virtual keyboard 606 displayed on a display screen of the device. When typing using thumbs, for example, the user will generally think that a central point of the underside of the thumb (from the perspective of the user) will be the primary contact point on the display screen. For example, in FIG. 6 the user might assume that the circle on the user's right thumb indicates where the thumb will provide input. Due to factors such as the shape of the user's thumb and the way the user presses on the screen, however, the actual location 608 where the user provides input using that thumb can be in a different location. In conventional devices, a user must learn to aim a certain direction when typing with the user's thumbs in order to avoid selecting incorrect elements. Approaches in accordance with various embodiments, however, can learn the relative offset for a particular user, and can map this offset for various perspectives, in order to compensate for where the user thinks input is being provided. For example, the device can track instances where the user attempts to provide input, then has to delete an input and select an adjacent input element. The device can monitor these occurrences over time, and when patterns or trends become significant, the device can begin to adjust input locations at certain regions of the screen to adjust where input is registered when a user presses on the screen. The adjustments can adapt over time such that an appropriate amount of offset will eventually be reached. As the user grows or changes input style, the offsets can continue to update as the input locations become less precise.

While many examples presented herein relate to text input and element selection, it should be understood that parallax corrections can be advantageous with other applications that rely on a touch or display screen as well. For example, gaming and drawing applications can benefit from adjustments that make screen or display-element based input more precise. Even when a user uses a stylus or other such device to provide input, the approach can benefit from parallax correction to improve accuracy.

As mentioned, various approaches can be used to attempt to locate and track specific features over time. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the head from various other objects in an image, and would have to identify the head as a head, regardless of the head's orientation. Such an approach can require shape or contour matching, for example, which can still be relatively processor intensive. A less processor intensive approach can involve separating the head from the background before analysis.

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's head is relatively close to the device, the head will appear relatively bright in the image. Accordingly, the background images will appear relatively, if not almost entirely, dark. This approach can be particularly beneficial for infrared (IR) imaging in at least some embodiments. Such an image can be much easier to analyze, as the head has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time. A further benefit is that the human eye is a retro-reflector and the pupils will show as bright spots in the reflected IR, such that the eyes can also potentially be easily separated from the background in at least some embodiments.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

It also should be understood that, in addition to information such as zoom level and field of view, it can also be important in at least some embodiments for the software to know the relative position of the cameras or other image capture elements on the device. For example, image information can be analyzed to determine directions or position vectors to features, but those determinations are relative to a center point (or other position) of the camera capturing that image information. In order to properly combine the vectors from different images to determine an intersection point, the separation between the cameras capturing those images should also be taken into account in at least some embodiments. Various approaches for three-dimensional mapping or modeling using stereoscopic imaging or other such approaches based at least in part upon camera separation can be used as known or used in the art. Other approaches such as active capacitive, passive capacitive, and ultrasonic approaches can be used for finger detection, and processes such as ambient or IR imaging, at one or more wavelengths, can be used for eye detection, among other such processes.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

In some embodiments, refractive effects due to the difference in the refractive indices of air and the material(s) of the display screen layers may also cause a slight shift in the position of the displayed graphical elements from the perspective of the user. While in many embodiments the effects will be so small as to be ignored, in certain embodiments it can be desirable to estimate the refractive effects using index information stored in the configuration information, for example, to determine refractive errors in addition to parallax errors, and use these errors as well when determining how much to adjust the image or touch sensitive regions. Approaches for determining such refractive effects are well known in the art and will not be discussed herein in detail.

Figure 7:
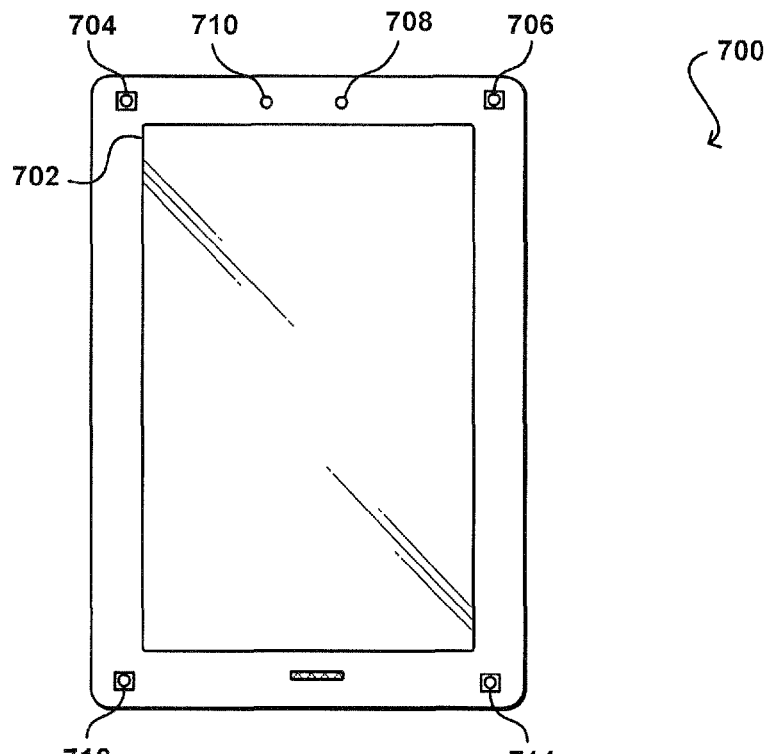
FIG. 7 illustrates an example computing device that can be used in accordance with various embodiments.

FIG. 7 illustrates an example computing device 700 that can be used to perform methods in accordance with various embodiments discussed and suggested herein. In this example, the device has four image capture elements 704, 706, 712, 714 positioned at various locations on the same side of the device as a display element 702, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 708 is included that can be used to determine an amount of light in a general direction of objects to be captured and at least one illumination element 710, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. The device can have a material and/or components that enable a user to provide "squeeze" input to the device by applying pressure at one or more locations. A device casing can also include touch-sensitive material that enables a user to provide input by sliding a finger or other object along a portion of the casing. Various other elements and combinations of elements can be used as well within the scope of the various embodiments as should be apparent in light of the teachings and suggestions contained herein.

Figure 8:
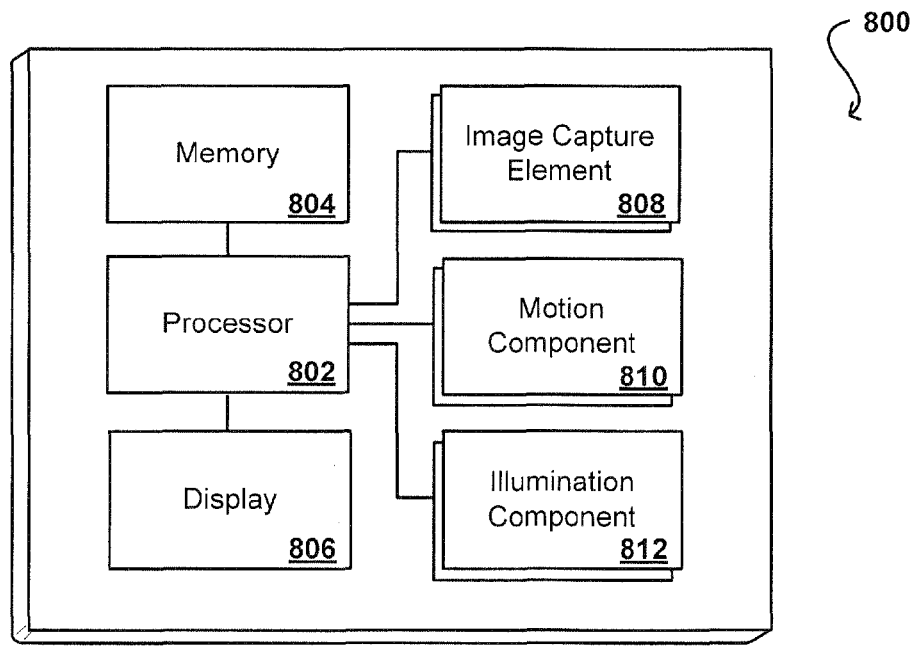
FIG. 8 illustrates an example configuration of components of a computing device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or non-transitory computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 810, such as an electronic gyroscope used to determine motion of the device for assistance in input determination. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
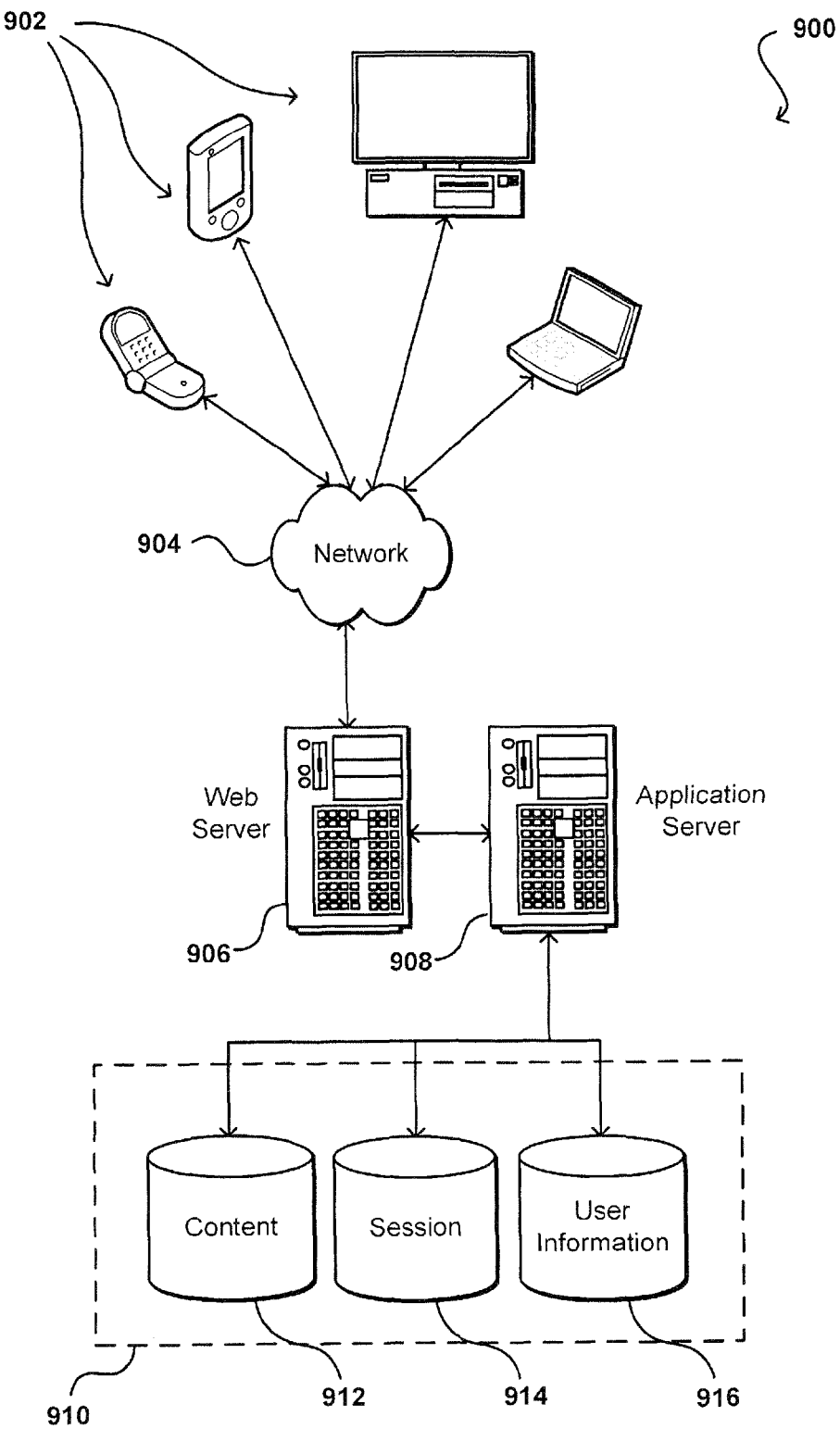
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of correcting for parallax errors in a touch screen of a computing device, comprising:
    capturing image information using a camera of the computing device;
    analyzing the image information, using a processor of the computing device, to track a relative position of a head of a user with respect to the computing device; and
    for a current relative position of the head:
        determining, using the processor of the computing device, an amount of offset between a first region and a second region of a touch sensitive surface of the touch screen, wherein the first region is mapped by the computing device to a graphical element displayed on a display surface of the touch screen and the second region corresponds to a viewed position, from the current relative position of the head, of the graphical element at the touch sensitive surface;
        updating a mapping of the graphical element from the first region to approximately the second region on the touch sensitive surface when the amount of offset exceeds an offset threshold, wherein the user is able to select the graphical element using the second region of the touch sensitive surface; and
        updating a displayed location of the graphical element such that the viewed position of the graphical element through the touch sensitive surface corresponds to the first region in response to determining that the amount of offset is greater than a maximum amount of acceptable offset but less than the offset threshold, wherein the user is able to select the graphical element using the first region of the touch sensitive surface.

2. The computer-implemented method of claim 1, wherein the graphical element is positioned near a center point of the display surface.

3. The computer-implemented method of claim 1, further comprising:
    determining additional mapped locations on the touch sensitive surface mapped to multiple display locations on the display surface; and
    updating at least one of the mapped locations or the display locations based at least in part upon the relative position of the head, each mapped location and corresponding display location corresponding to one or more of a different amount or direction of parallax error for off-axis positions of the head.

4. The computer-implemented method of claim further comprising:
    determining a relative position of eyes of the user with respect to the computing device using the image information, wherein the relative position of the eyes is further used to determine the amount of offset.

5. A computer-implemented method of displaying content on an electronic device, comprising:
    displaying content on a touch screen of the electronic device, the touch screen having a first surface for displaying the content and a second surface enabling a user to provide touch input to the electronic device, the first surface being separated from the second surface;
    determining a viewing perspective of the user with respect to the touch screen;
    determining an amount of offset between a first region of the first surface and a second region of the second surface based on the viewing perspective, wherein the first region corresponds to a rendering position for at least one element of the content displayed on the first surface and the second region corresponds to a touch input location for the at least one element on the second surface;
    updating the rendering position for the at least one element content on the first surface in response to determining that the amount of offset is greater than a specified amount of offset but less than an offset threshold; and updating the touch input location for the at least one element on the second surface in response to determining that the amount of offset exceeds the offset threshold.

6. The computer-implemented method of claim 5, further comprising:

capturing image information to locate at least one feature of the user; and analyzing the image information to determine a relative position of the at least one feature.

7. The computer-implemented method of claim 6, wherein the feature includes at least one of a head, eyes, or facial feature of the user.

8. The computer-implemented method of claim 6, wherein the at least one feature is located in the image information using at least one of an image recognition algorithm, a contour matching algorithm, a retro-reflection detecting algorithm, or a color matching algorithm.

9. The computer-implemented method of claim 5, wherein the touch screen provides at least one of capacitive, resistive, or optical touch detection.

10. The computer-implemented method of claim 5, further comprising:

determining a plurality of different amounts of offsets for different portions of the touch screen; and updating the different portions of the touch screen by different amounts or in different directions corresponding to the different amounts of offsets.

11. The computer-implemented method of claim 5, further comprising:

determining a specified amount of illumination needed to locate a feature of a user for determining the viewing perspective of the user; and activating an illumination element when a current amount of illumination is less than the specified amount of illumination.

12. The computer-implemented method of claim 11, wherein the illumination element produces visible light or infrared radiation.

13. The computer-implemented method of claim 5, further comprising:

updating a scale of the at least one element or the touch input location to account for foreshortening based on the viewing perspective.

14. A computing device, comprising:

a processor;

a camera;

a touch screen having a first surface for displaying content and a second surface enabling a user to provide touch input to the computing device, the first surface being separated from the second surface; and a memory device including instructions that, upon being executed by the processor, cause the computing device to:

capture image information using the camera to locate at least one feature of the user;

determine a viewing perspective of the user based at least in part upon the located at least one feature;

determine an amount of offset between a first region of the first surface and a second region of the second surface based on the viewing perspective, wherein the first region corresponds to a rendering position for at least one element of the content displayed on the first surface and the second region corresponds to a touch input location for the at least one element on the second surface;

update the rendering position for the at least one element on the first surface in response to determining that the amount of offset is greater than a specified amount of offset but less than an offset threshold; and update the touch input location for the at least one element on the second surface in response to determining that the amount of offset exceeds the offset threshold.

15. The computing device of claim 14, wherein the instructions, upon being executed, to cause the computing device to determine the viewing perspective include causing the computing device to:

analyze the image information to determine a relative position of the at least one feature.

16. The computing device of claim 14, wherein the instructions, upon being executed, further cause the computing device to:

determine a plurality of different amounts of offsets for different portions of the touch screen; and update the different portions of the touch screens by different amounts or in different directions corresponding to the different amounts of offsets.

17. The computing device of claim 14, wherein the instructions, upon being executed, further cause the computing device to:

determine a specified amount of illumination needed to locate the at least one feature of the user; and activate an illumination element when a current amount of illumination is less than the specified amount of illumination.

18. The computing device of claim 17, wherein the illumination element produces visible light or infrared radiation.

19. A non-transitory computer-readable storage medium storing instructions that, upon being executed by at least one processor of a computing device, cause the computing device to:

display content on a touch screen of the computing device, the touch screen having a first surface for displaying the content and a second surface enabling a user to provide touch input to the computing device, the first surface being separated from the second surface;

determine a position of a feature of a user with respect to the computing device;

determine a viewing perspective of the user based at least in part upon the position of the feature;

determine an amount of offset between a first region of the first surface and a second region of the second surface based on the viewing perspective, wherein the first region corresponds to a rendering position for at least one element of the content displayed on the first surface and the second region corresponds to a touch input location for the at least one element on the second surface;

update the rendering position for the at least one element on the first surface in response to determining that the amount of offset is greater than a specified amount of offset but less than an offset threshold; and update the touch input location for the at least one element on the second surface in response to determining that the amount of offset exceeds the offset threshold.

20. The non-transitory computer-readable storage medium of claim 19, wherein the instructions, upon being executed, further cause the computing device to:

determine a plurality of different amounts of offsets for different portions of the touch screen; and update the different portions of the touch screens by different amounts or in different directions corresponding to the different amounts of offsets.

21. The non-transitory computer-readable storage medium of claim 19, wherein the position of the feature of the user is determined using at least one of an image recognition algorithm, a contour matching algorithm, a retro-reflection detecting algorithm, or a color matching algorithm.

22. The non-transitory computer-readable storage medium of claim 19, wherein the instructions, upon being executed, further cause the computing device to:

update a scale of the at least one element or the touch input location to account for foreshortening based on the viewing perspective.

\* \* \* \* \*